United States Patent [19]
Blymiller et al.

[11] 3,789,399
[45] Jan. 29, 1974

[54] FREQUENCY DISCRIMINATOR DEVICE

[75] Inventors: Arthur L. Blymiller, Rome; John E. Snodgrass, Oneida, both of N.Y.

[73] Assignee: The United States of America as represented by the Secretary of the United States Air Force, Washington, D.C.

[22] Filed: Sept. 28, 1961

[21] Appl. No.: 141,548

[52] U.S. Cl. ............... 343/14, 324/77 R, 324/77 F, 324/78 R, 324/78 F, 343/123
[51] Int. Cl. .......................... G01s 9/23, G01s 9/24
[58] Field of Search 324/77, 78, 88, 82, 77 R, 77 F, 324/78 R, 78 F; 315/18, 25; 179/1.5 AS; 343/123, 5, 14

[56] References Cited
UNITED STATES PATENTS
2,434,914  1/1948  Earp ..................................... 324/82
2,691,137  10/1954  Smith ............................... 179/1 AS
FOREIGN PATENTS OR APPLICATIONS
1,158,550  1/1958  France ................................. 324/77

*Primary Examiner*—Benjamin A. Borchelt
*Assistant Examiner*—G. E. Montone

EXEMPLARY CLAIM

1. A frequency discriminator for monitoring over a wide frequency range of radar pulsed transmission comprising multiplexing means for receiving a plurality of signal pulse trains having progressively differing pulse repetition rates, a plurality of filter means having progressively varying pulse frequency reception rates spanning the range of variation in the pulse repetition rates of said plurality of signal pulse trains, coupling means between said multiplexing means and said filter means whereby each pulsed signal is channelized by said multiplex means into the input of a corresponding channel filter means, a plurality of voltage resolving means receiving the output of at least three of said filter means, and means for indicating the voltage resolution pattern registered at said voltage resolving means.

5 Claims, 6 Drawing Figures

INVENTORS
ARTHUR L. BLYMILLER
AND JOHN E. SNODGRASS

FREQUENCY DISCRIMINATOR DEVICE

The invention described herein may be manufactured and used by or for the United States Government for governmental purposes without payment to us for any royalty thereon.

The present invention relates to radar systems, and more particularly to an instantaneous frequency discriminator. In military communications, the ability to monitor activity within a wideband of frequency, with instantaneous intercept and frequency resolving capability, is a problem of large magnitude.

The present invention has utility in monitoring microwave frequency, inter alia, in the ultra high frequency range, in the $x$-band, and even in the $k$-band of frequencies.

Accordingly, it is an object of this invention to provide an instantaneous frequency discriminator device which provides intercept and analysis of frequency over a wide frequency range without severe compromise in sensitivity, accuracy and resolution.

Another object of this invention is to provide an instantaneous frequency discriminator device to be employed with radar pulsed or continous wave type transmission.

A further object is to provide an instantaneous frequency device such that outputs from at least three channels are available from one intercept.

A still further object is to provide a frequency discriminator device which is economical to manufacture and conducive to mass production.

The principle of the novel device herein described is based on the utilization of overlapping filters whose channel bandwidth pattern approximates a sine function. The summing of the amplitudes as vector quantities enables an output resultant related to frequency.

The invention is essentially an amplitude comparison and summing device. The pulse trains of intercepted radar signals having progressively differing pulse repetition rates are amplified and then multiplexed into a plurality of filter means spanning the range of variation in the pulse signal repetition rates. These filters are assigned a specific frequency coverage so that they overlap in frequency coverage and form a bandwidth pattern approximating a sinusoidal waveform with centering such that outputs from at least three filters will be available from one signal intercept. A voltage summing network then operates on the amplitudes of the signals as determined by their position within the passband of the related filters; the resultant is then displayed as a vector directly related to the frequency of the intercepted pulse train of radar signals.

To fully explain the device, an ultra high frequency receiver for application over a wideband of 250–500 megacycles is described with the discriminator functioning as part of said receiver. Other features and aspects of the invention are defined in the appended claims.

The invention may be best understood from the following description taken in conjunction with the accompanying drawing in which.

Figure 5:
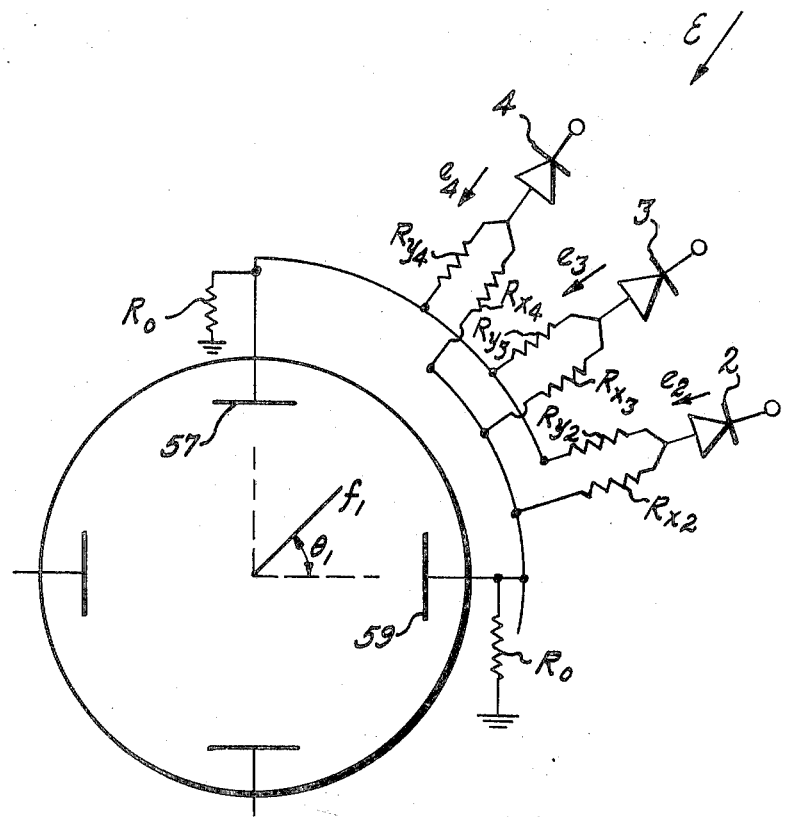

FIGS. 4a, b and c illustrate resultant vector read-out of signal frequencies in a cathode ray tube;

FIG. 5 illustrates diagrammatically the resolving circuit; and

Figure 6:
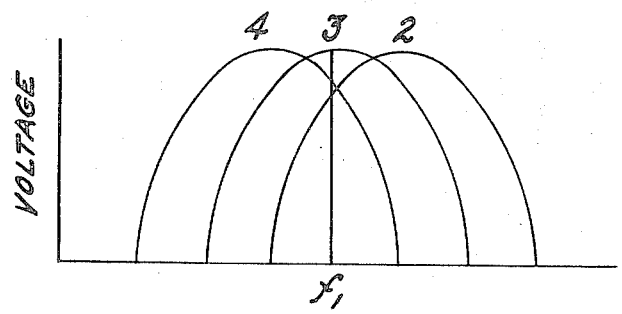

FIG. 6 illustrates a signal frequency overlapping three channels.

Figure 1:
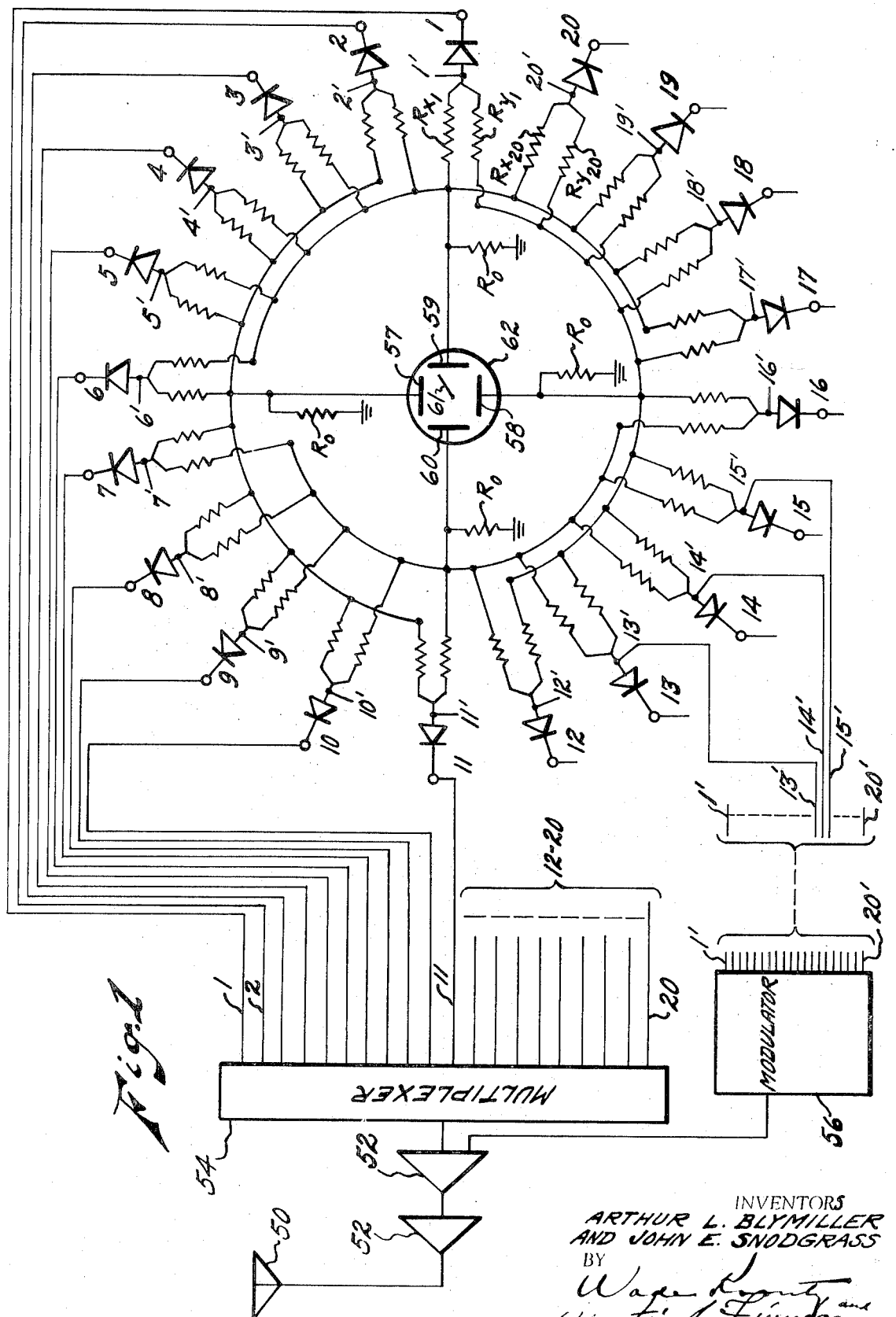
FIG. 1 illustrates in block and diagrammatic form an embodiment of the frequency discriminator in an ultra high frequency receiver.

Referring now to FIG. 1, radar pulses incident on antenna 50 are fed to a receiver having low noise, wideband traveling wave tube amplifiers (TWT) 52 for amplification on the order of 50–60 db. This amplification capability over the 250–500 megacycle bandwidth presents high level signal envelopes to the frequency discriminator network.

The frequency discriminator circuitry comprises the remaining part of the UHF receiver design. The multiplexer unit 54 is connected to the TWT amplifiers 52 in the block diagram of FIG. 1. The function of unit 54 is to multiplex or channel each signal received from the TWT 52 into the proper active channel filter (1–20). To accomplish this multiplexing function, a passive transmission line is properly matched and terminated; however, a matched distributed line utilizing active devices (tube) could be used for channel isolation.

A multiplexer such as the one described on pages 708 and 709 in Vol. 9 of the Radiation Lab. Series, McGraw-Hill Book Co, Inc., 1948 entitled: *MICROWAVE TRANSMISSION CIRCUITS* may be used; with a more detailed description appearing in a report by A. G. Fox, entitled: *WAVEGUIDE FILTER AND TRANSFORMER* BTL Report MM–41-160-25, Apr. 30, 1941.

Although the invention as described herein has inherent advantages employed with the normal radar pulsed type of transmission, it can also be utilized for determining the presence of a continuous wave transmission by adding an internal modulator 56 to the receiver as shown in FIG. 1 from the output of *TWT* 52 to the outputs of filters (1' –20'). By application of an internal modulation the incoming continuous wave signal is processed in a normal manner by proper use of one of the modulators descibed in Chapters 3 and 6 Vol. 19 of the Radiation Lab Series, McGraw-Hill Book Co. Inc. , 1949 entitled: *WAEFORMS*. However, if a rapid scan antenna is employed, modulator 56 is not needed.

The active channel filters 1–20 are actually narrow band amplifiers. The essence of the invention is the utilization of overlapping filters as shown in FIG. 5 such that the channel bandwidth pattern approximates a sinusoidal waveform with centering so that outputs from at least three channels will be available from one intercept frequency. As shown in FIG. 6 the summing of the signal amplitudes in the different channels for the same frequency yields a resultant vector directly related to the intercepted frequency. Note the resultant vector read-out 61 in FIG. 1.

In the preferred embodiment, an assigned specific frequency channel coverage (peak to peak) of 14 megacycles is used in this UHF receiver, but it is to be clearly understood this frequency coverage does not depict the limits or extremes of the channel widths and/or separation.

Figure 2:
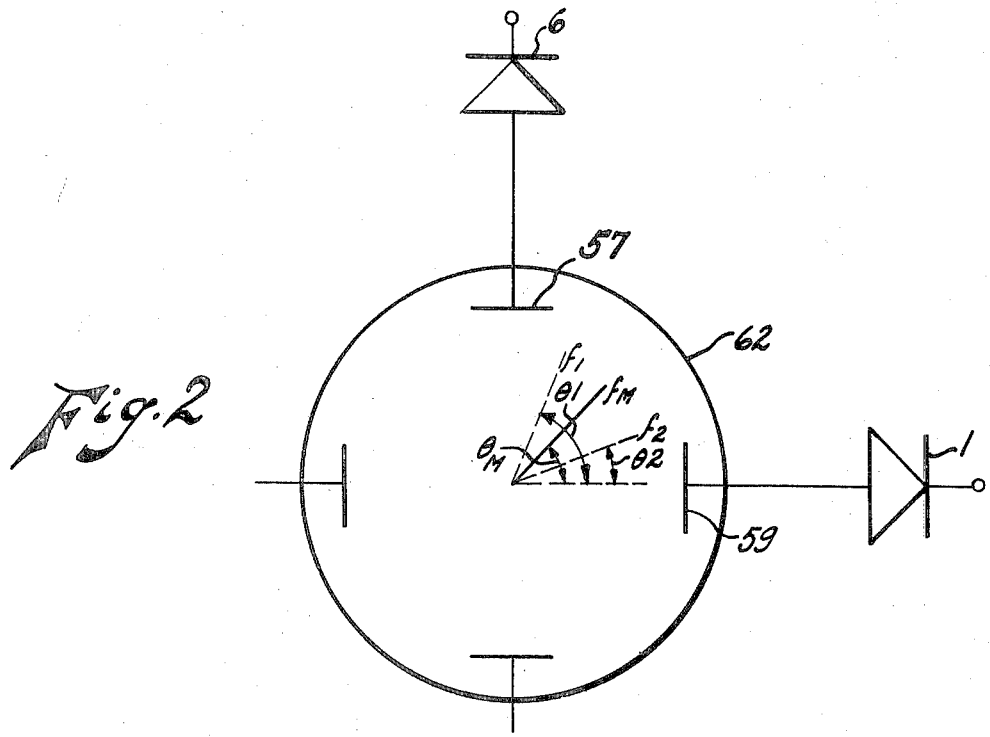
FIG. 2 illustrates diagrammatically a basic form of the method of read-out.
Figure 3:
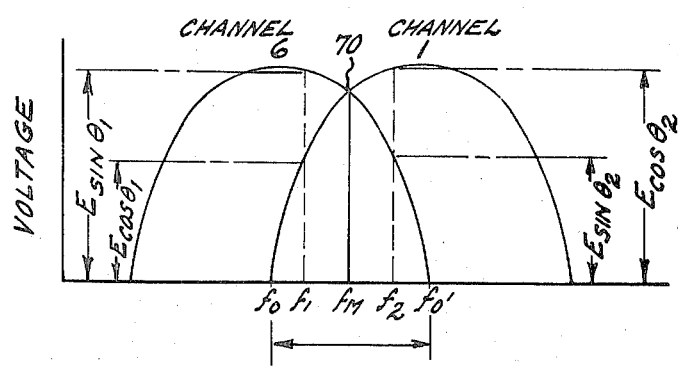
FIG. 3 illustrates various signal frequencies in overlapping channels.
Figure 4:
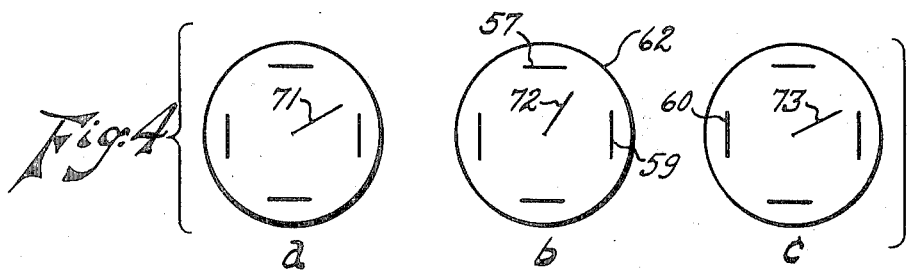

To more fully comprehend the basis of our overlapping channel principle and the means of read-out, FIGS. 2, 3 and 4 are to be taken in conjunction with each other. Consider the basic two-channel device illustrated in FIG. 2 wherein the outputs of channels 1 and 6 are placed on the plates 57 and 59 of the cathode ray tube 62.

If the maximum magnitude of the voltage from each channel is $E$, then the outputs of the channels as applied to the plates of the CRT 62 are:

$E \sin \theta$ for channel 6
$E \cos \theta$ for channel 1
$\theta_1 = tan^{-1} (E\sin\theta/E\cos\theta)$ In FIG. 2, the angle $\theta$ is 45° in the case where the signal frequency $f_m$ is in the exact cross-over, 70, as shown in FIG. 3 where the amplitude is equal in both channels; this vector resultant 71 is also shown in FIG. 4a. From an examination of FIG. 3, it can be seen that at frequency $f_1$ the voltage at $f_1$ in channel 6 is greater than the voltage at $f_1$ in channel 1, ergo the $E \sin \theta$ voltage for channel 6 predominates and the resultant vector 72 is shown in FIG. 4b. In a similar manner, at frequency $f_2$, the $E \cos \theta$ voltage for channel 1 predominates in FIG. 3 and the resultant vector 73 is shown in FIG. 4c.

The frequency is determined as a direct measurement of the angle $\theta$. As FIG. 3 indicates the frequency value can be read from $f_o$ to $f_o'$, or from a vector quadrant of the CRT 62 from 0° to 90° as indicated in FIG. 2. The error is a function of the shape of the pass band, the linearity of the summing circuit and the geometry of the CRT, and is minimized by controlling these variables; for example, by one's choice of components and instruments in the frequency range under analysis the errors in frequency and resolving capability inter alia are minimized.

After the active channelizing and filtering has been performed, the voltage, the amplitude being dependent on the frequency value within the pass band, is transferred to a vector resolving network.

The vector resolving network accomplishes voltage division by the weighing of the resistive components $Rx_1$, $Ry_1$, and $Rx_2$, $Ry_2$, etc., according to the sine and cosine related angle.

In FIG. 5, several channels (4, 3 and 2) of the discriminator of FIG. 1 are shown. The summing or adding circuit is shown as a ratio of resistive networks. Geometric angles as determined by the outputs of different channels and as observed on the oscilloscope can be made directly related to the ratio of the $x$ and $y$ resistive components; for example (see FIG. 5), $$Ro/(Ry + R_o) \cong \sin \theta$$
$$Ro/(Rx + R_o) \cong \cos \theta$$

It is to be noted the amplitude of the voltage output from each channel has been determined by the channel distribution of the pulse trains of intercepted radar signals *before* detection.

In FIG. 5, a signal voltage $E$ of frequency $f_1$ is applied to channels 2, 3 and 4. From the channel distribution in FIG. 6, it can be seen that certain percentages of $E$ must appear in channels 2, 3 and 4 in relation to the position of $f_1$. Referring to FIG. 6, it can be seen that when a signal $E$ is applied to the channels, voltages $e_4$, $e_3$ and $e_2$ are derived, their values being dependent on the signal position in channels 4, 3 and 2, respectively. Voltage $e_4$ is distributed across the resistive networks of $Ry_4/R_o$ and $Rx_4/R_o$. In a similar manner, voltages $e_3$ and $e_2$ are distributed across the resistive networks of $Ry_3/R_o$ and $Rx_3/R_o$ and $Ry_2/R_o$ and $Rx_2/R_o$ respectively. Hence, $E \sin \theta = e_4 (R_o/Ry_4 + R_o) + e_3 (R_o/Ry_3 + R_o) + e_2 (R_o/Ry_2 + R_o) + E_y$ $E \cos \theta = e_4 (R_o/Rx_4 + R_o) + e_3 (R_o/Ry_3 + R_o) + e_2 (R_o/Rx_2 + R_o) = E_x$ The resultant vector addition will simply provide the trigonometric function of $\theta = tan^{-1} (Ey/Ex)$ Referring now to FIG. 1, this figure illustrates how the voltage division and hence frequency recognition is accomplished by applying: the sin voltage of channels 11, 10, 9, 8, 7, 6, 5, 4, 3 and 2 to plate 57; the sin voltage of channels 12, 13, 14, 15, 16, 17, 18, 19, 20 and 1 to plate 58, the cos voltage of channels 17, 18, 19, 20, 1, 2, 3, 4, 5, and 6 to plate 59: and the cos voltage of channels 7, 8, 9, 10, 11, 12, 13, 14, 15 and 16 are applied to plate 60 in accordance with the equations for $E \sin \theta$ and $E \cos \theta$ as given above.

As illustrated in FIG. 1, the resultant vector 61 is displayed on a cathode ray tube as a strobe whose magnitude is proportional to received signal strength and whose direction or angle value is proportional to frequency. Calibration of the cathode ray tube (frequency reading on periphery) provides a visual frequency readout of the transmission.

It is apparent to those skilled in the art that the above-described frequency discriminator system is applicable to microwave frequencies and throughout lower ranges than the UHF design as described. An example of this versatility would encompass the design of a discriminator to function at the $x$-band of frequencies. Passive filters may be required in the higher bands but the technique is not altered and the frequency discrimination would be accomplished in the same manner. In fact, frequency discrimination of signals in even the $k$-band range may be accomplished by heterodyning the $x$-band range where the related discriminator can be utilized.

While we have described above the principles of our invention in connection with specific apparatus, it is to be clearly understood that this description is made only by way of example and not as a limitation to the scope of our invention.

we claim:

1. A frequency discriminator for monitoring over a wide frequency range of radar pulsed transmission comprising multiplexing means for receiving a plurality of signal pulse trains having progressively differing pulse repetition rates, a plurality of filter means having progressively varying pulse frequency reception rates spanning the range of variation in the pulse repetition rates of said plurality of signal pulse trains, coupling means between said multiplexing means and said filter means whereby each pulsed signal is channelized by said multiplex means into the input of a corresponding channel filter means, a plurality of voltage resolving means receiving the output of at least three of said filter means, and means for indicating the voltage resolution pattern registered at said voltage resolving means.

2. Apparatus as described in claim 1 wherein said plurality of active channel filter means are assigned a specific frequency coverage, said coverage overlapping in frequency to provide a bandwidth pattern approximating a sinusoidal waveform with centering such that output voltages from at least three channels of said plurality of channel filters will be available for each intercepted frequency of said pulse repetition rates.

3. Apparatus as described in claim 1 wherein said voltage resolving means consists of a resistive network for summing the sine values of output voltages from said filter means and a resistive network for summing cosine values of output voltages from said channel filter means, the ratio of said sine and cosine values providing a monitoring function of the frequency of the pulse repetition rates of said incident signal pulse trains.

4. Apparatus as described in claim 1 wherein said means for indicating the voltage resolution pattern at said voltage resolving means is a cathode ray tube having sine voltage outputs from said voltage resolving means connected to vertical plates of said cathode ray tube and having cosine voltage outputs from said resolving means connected to the horizontal plates of said tube, and readout is a strobe whose magnitude is proportional to said radar signal and whose direction is directly related to the intercepted frequency of said signal pulse trains.

5. Frequency discriminator apparatus for monitoring over a wide frequency range of continuous wave radar transmission comprising amplifying means, multiplexing means for receiving a plurality of said continuous waves having progressively differing repetition rates, a plurality of filter means having progressively varying wave reception rates spanning the range of variation in the repetition rates of said wave, coupling means between said multiplexing means and said filter means whereby each continuous wave is channelized by said multiplexing means into the input of a corresponding filter means, modulator means connected to said amplifying means and to said filter means to prevent saturation of said filter means, a plurality of voltage resolving means receiving the output of at least three of said filter means, and means for indicating the voltage resolution pattern registered at said voltage resolving means.

* * * * *